Aug. 18, 1936. W. V. JORDAN 2,051,484
FLUID REGULATING VALVE
Filed Jan. 29, 1934

Inventor
William V. Jordan
By Arthur J. Robert
Attorney

Patented Aug. 18, 1936

2,051,484

UNITED STATES PATENT OFFICE 2,051,484

FLUID REGULATING VALVE

William V. Jordan, Louisville, Ky.

Application January 29, 1934, Serial No. 708,764

4 Claims. (Cl. 50—23)

This invention relates to fluid regulating valves and, more particularly, to valves of the type having a device which is automatically responsive to changes in one characteristic of the fluid on one side of the valve, for varying the communication with the other side of the valve. While the invention is adapted for various uses, it is herein described as an automatic pressure-reducing valve where it functions to regulate the flow of a fluid such as water, steam or gas from a high pressure line to a low pressure line so as to maintain the pressure on the low side at some predetermined constant value.

Heretofore, pressure reducing valves of this type have consisted of a valve head connected on the low side to a pressure responsive device which tends to maintain a constant pressure in the low side by moving the head automatically toward or away from the valve seat as the pressure in the low side rises above or falls below the value at which the pressure responsive device is adjusted. A disadvantage of this type of valve is that the valve must be ground or otherwise treated from time to time to eliminate rust and other formations which occasion leakage by preventing the proper seating of the valve head. Furthermore, it has been found that if a very small opening is created during the proper or improper seating of the valve, a high pressure fluid, such as steam, will "wire draw", that is to say, cut a substantial opening in the surrounding metal and thereby so damage the valve as to prevent it from functioning properly. The type of valve mentioned being subject to leakage through the formation of rust is, as a consequence, subject also to "wire drawing."

Another disadvantage of the old type of valve is that the valve head normally moves parallel to the fluid flowing through the valved opening so that the pressure responsive device must, in opposite directions, respectively act with and against the thrust produced by the flow of fluid. It has, heretofore, been proposed to correct this condition by providing in each valve, a pair of valve heads which are connected to the same pressure responsive device arranged in such manner as to counter-balance the thrust in both directions of movement. Obviously, this remedy complicates the construction of the valve and, consequently, increases the cost of its manufacture.

An important object of this invention is to provide a valve in which the formation of rust or other deleterious substances on the valve seat or the contacting portion of the valve head is effectively prevented at all times, and, one which is not subject to "wire drawing".

Another important object of this invention is to arrange the valve head for movement at right angles to the flow of fluid whereby the thrust action of the fluid can be eliminated or substantially reduced even when using a single valve head.

A further object is to provide an extremely simple and inexpensive form of construction which can be easily assembled or taken apart.

The invention is illustrated in the accompanying drawing, wherein.

Figure 1:
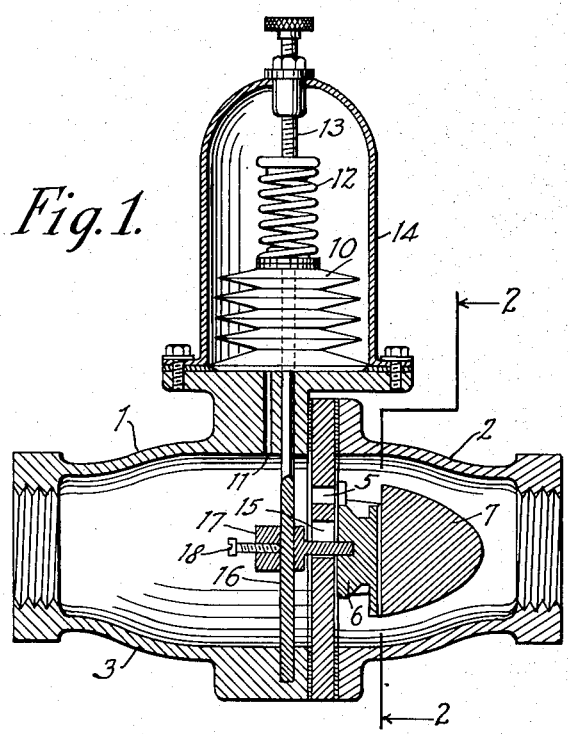
Figure 1 is a vertical sectional view of a valve constructed in accordance with my invention.
Figure 2:
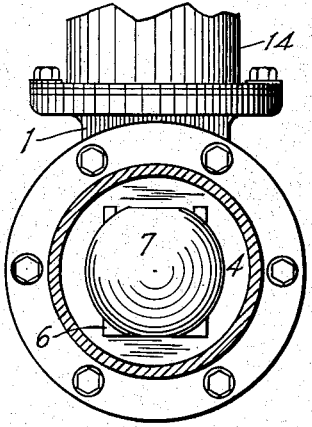
Figure 2 is a section taken along line 2—2 of Figure 1.
Figure 3:
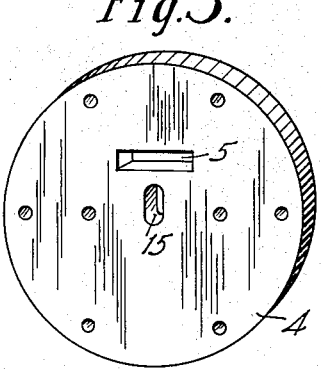
Figure 3 is a perspective view of the wall or plate which separates the inlet and outlet chambers of the valve.
Figure 6:
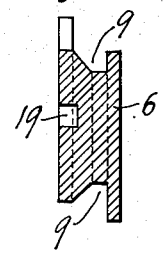
Figure 6 is a section taken along line 6—6 of Figure 5.
Figure 5:
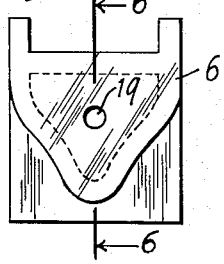
Figure 5 is a plan view of the plate side of the valve head.
Figure 4:
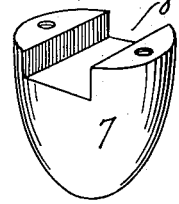
Figure 4 is a perspective view of the member which covers the valve head on the high side thereof.
Figures 7, 8:
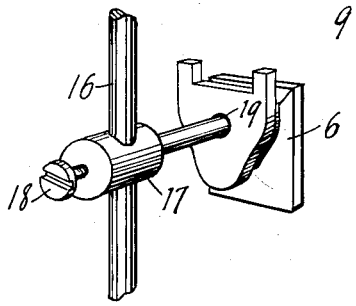
Figure 7 is an end elevation of the valve head.
Figure 8 is a perspective view of the connection between the valve head and the pressure responsive mechanism.

The structure of the valve includes a valve body 1 composed of a suitable material such as metal, and fashioned in any suitable shape. As shown, the valve has tubular sections 2 and 3 which respectively define the high and low pressure or inlet and outlet chambers. These chambers are separated by a plate 4 having a connecting passage 5 for the flow of fluid from one chamber to another. The section 2 and plate 4 may, if desired, be made integral with section 3, but preferably are made separate so as to facilitate the manufacture of the valve and access to its interior, the separate parts mentioned being bolted or otherwise secured to the section 3.

In further accordance with my invention, I provide a valve head 6 which is arranged for sliding movement over an opening of the connecting passage 5 and against the valve seat provided in this embodiment, by the surface of the plate 4. While this head may be arranged on either side of the plate 4, it preferably is placed on the high side where the high pressure will tend to hold it in intimate contact with the valve seat. If the surface of the head on the high pressure side be fully exposed, it should be reduced to a minimum so as to keep at a minimum the force required to slide the head along the valve seat. However, a finer degree of regulation can be secured by properly covering the surface of the valve head to prevent or limit the force of high pressure acting on it in the direction of the plate. To this end, I provide a member 7 of suitable shape which may be bolted or otherwise secured to the plate and arranged to cover the surface of the valve head on the high pressure face thereof. This cover member 7 is provided with an open ended guideway 8 having a depth such that when the cover member is bolted to the plate, opposite faces of the valve head are snugly fitted respectively against the plate and cover member. I have found that the valve head can be moved more easily or made to "float" in the guideway by recessing the sides of the head in such manner as to provide a surface area, against which the high pressure acts to force the head against the plate, which (surface area) is less than the opposite surface area against which the high pressure acts to force the head away from the plate.
In other words, the total high pressure force acting on the valve head within the recess 9 is made greater in a direction away from the plate than it is toward the plate.

It may be pointed out at this time that the connecting passage 5 is made wide and the valve head shaped accordingly so that the smallest opening created during the operation of the valve will be of considerable width. In this manner, the creation of openings which are small in length and width or in diameter, is avoided; hence, the "wire drawing" incident to such openings is likewise avoided.

The pressure responsive device utilized may be of any suitable type, the type shown having a bellows 10 which is secured to a wall of section 3 and placed in communication with the low pressure chamber by a fluid passage 11 in that wall. The bellows 10, when expanding, act against a spring 12 which is interposed between the bellows and an adjusting screw 13. The bellows and spring are enclosed by the usual housing 14.

While the connection between the valve head and bellows may be made in any desired manner, the arrangement shown wherein the connection is effected through an opening 15 in the plate, is preferred because of its simplicity. This connection includes a rod 16 which extends from the interior of the bellows into the low pressure chamber, one end of the rod being secured to the bellows so as to move therewith and the other end being positioned within a guideway formed in a wall of the low pressure chamber. The rod 16 carries a cross member 17 which extends through plate opening 15 into engagement with the valve head 6. In order to permit the rod 16 to be removed from or inserted into the low pressure chamber with ease and speed and thus facilitate the assembly or dissembly of the valve, the cross member 17 is secured to the rod by a set screw 18 which is readily accessible through the outlet opening of the low pressure chamber. Also, to the end of furthering the ease of assembly or dissembly, the connection between the cross member 17 and valve head 6 is effected simply by causing the end of the cross member to fit into a recess 19 on the sliding face of the head 6. With this type of connection it is manifest that the cover member 7 not only maintains the valve head in engagement with the cross member, but also prevents the head from turning angularly about the end of the cross member, thus holding it in alignment with the opening of the connecting passage 5.

Since the operation of the valve is obvious, it should suffice to say that the pressure responsive device will effect a sliding movement of the valve head back and forth across the opening of the connecting passage 5 at a frequency and to an extent largely determined by the pressure variations in the low pressure chamber. By so doing, the valve will tend to maintain the pressure in that chamber at the valve to which the pressure responsive device is set.

It will be readily appreciated that the valve head, in sliding over the valve seat, will keep the seat free of rust or other deleterious formations and, hence, free of improper seating or "wire drawing". Furthermore, the contact between the plate and valve head prevents any leakage occurring through plate opening 15 which is covered by the head 6 throughout the full range of its sliding movement. Finally, while obvious, it may be pointed out that the condition of the interior of the valve may be thoroughly inspected after removing the bolts by which section 2 is attached to section 3. This released plate 4, exposing the interior of the low pressure chamber and, at the same time, disengaging the valve head 6 from the cross member 17, thereby permitting the valve head to be completely disengaged from the plate 4 and cover member 7.

While the invention has been explained as a pressure regulator, it will now be obvious that it may readily be adapted to other uses. For example, the movement of the valve head may, with but slight changes, be controlled by a device responsive to a characteristic of the fluid other than pressure such as temperature.

Having described my invention, I claim:

1. An automatic pressure reducing valve having a valve body divided into inlet and outlet chambers which are connected by a fluid passage, a valve seat at the high pressure end of said passage, a valve head arranged for slidable movement over said seat to vary the communication afforded by said passage between said chambers, means for moving said head automatically in response to changes in the pressure of the fluid in one of said chambers, and means for counteracting the force of the high pressure fluid which acts to press the valve head against the surface over which it moves.

2. An automatic pressure reducing valve having a valve body divided into inlet and outlet chambers which are connected by a fluid passage, a valve seat at the high pressure end of said passage, a valve head arranged for slidable movement over said seat to vary the communication afforded by said passage between said chambers, means for moving said head automatically in response to changes in the pressure of the fluid in one of said chambers, said valve head providing a surface against which the high pressure may act to force the valve head against the surface over which it moves, and stationary means extending closely over a substantial portion of said surface to facilitate the floating of said head.

3. An automatic pressure reducing valve having a valve body divided into inlet and outlet chambers which are connected by a fluid passage, a valve seat at the high pressure end of said passage, a valve head arranged for slidable movement over said seat to vary the communication afforded by said passage between said chambers, means for moving said head automatically in response to changes in the pressure of the fluid in one of said chambers, said valve having a surface area against which the high pressure fluid may act to force the valve head toward and away from the surface over which it moves, and stationary means extending closely over a portion of the surface against which the high pressure would act to force the valve head against the surface over which it moves whereby the floating of said head is facilitated.

4. An automatic pressure reducing valve having a valve body divided into separable sections which respectively define the high and low pressure chambers, a removable plate interposed between and clamped in position by said sections, said plate having a fluid passage connecting said chambers, a valve seat at the high pressure end of said passage, a valve head arranged for slidable movement over said seat to vary the communication afforded by said passage between said chambers, a pressure responsive device connected to the low pressure chamber and having a member which projects into said chamber and which moves in accordance with the low pressure variations, a cross member extending through said plate and connected on opposite sides thereof respectively to said valve head and said pressure responsive member, and a cover member extending closely over the high pressure face of said valve head to facilitate the floating of said head, said cover member being secured to said plate.

WILLIAM V. JORDAN.